(12) United States Patent
Nakane

(10) Patent No.: US 8,479,712 B2
(45) Date of Patent: Jul. 9, 2013

(54) PULSATION REDUCING APPARATUS

(75) Inventor: Noriaki Nakane, Komaki (JP)

(73) Assignee: Denso Corporation, Kariya (JP)

( * ) Notice: Subject to any disclaimer, the term of this patent is extended or adjusted under 35 U.S.C. 154(b) by 594 days.

(21) Appl. No.: 12/709,705

(22) Filed: Feb. 22, 2010

(65) Prior Publication Data

US 2010/0212639 A1 Aug. 26, 2010

(30) Foreign Application Priority Data

Feb. 24, 2009 (JP) .................................. 2009-40144

(51) Int. Cl.
*F02M 37/00* (2006.01)
*F16L 55/027* (2006.01)
(52) U.S. Cl.
USPC ............................................ 123/511; 138/40
(58) Field of Classification Search
USPC ............. 123/511, 510, 198, 198 D, 514, 456, 123/446, 454, 455, 457, 459, 506; 138/37–46
See application file for complete search history.

(56) References Cited

U.S. PATENT DOCUMENTS

| | | | | |
|---|---|---|---|---|
| 5,195,494 A | * | 3/1993 | Tuckey | 123/514 |
| 5,749,345 A | * | 5/1998 | Treml | 123/456 |
| 5,873,349 A | * | 2/1999 | Tuckey et al. | 123/514 |
| 5,878,718 A | * | 3/1999 | Rembold et al. | 123/456 |
| 5,887,572 A | * | 3/1999 | Channing | 123/514 |
| 5,988,213 A | * | 11/1999 | Yoshioka | 137/590 |
| 6,021,759 A | * | 2/2000 | Okajima et al. | 123/467 |
| 6,102,010 A | * | 8/2000 | Isozumi et al. | 123/506 |
| 6,135,734 A | * | 10/2000 | Isozumi et al. | 417/542 |
| 6,159,383 A | * | 12/2000 | Gullett et al. | 210/741 |
| 6,209,525 B1 | * | 4/2001 | Konishi et al. | 123/467 |
| 6,371,088 B1 | * | 4/2002 | Wheeler | 123/514 |
| 6,520,162 B1 | * | 2/2003 | Schueler | 123/510 |
| 6,792,915 B2 | * | 9/2004 | Rembold et al. | 123/446 |
| 7,401,593 B2 | * | 7/2008 | Rembold et al. | 123/467 |
| 7,513,240 B2 | * | 4/2009 | Usui et al. | 123/467 |
| 7,527,035 B2 | * | 5/2009 | Schroeder | 123/446 |
| 7,559,313 B2 | * | 7/2009 | Tokuo et al. | 123/501 |

(Continued)

FOREIGN PATENT DOCUMENTS

| | | |
|---|---|---|
| JP | 06-101793 | 4/1994 |
| JP | 2007-085332 | 4/2007 |

OTHER PUBLICATIONS

Chinese Office Action dated Mar. 26, 2012, issued in corresponding Chinese Application No. 201010118934.7 with English Translation.

(Continued)

*Primary Examiner* — Stephen K Cronin
*Assistant Examiner* — Sherman Manley
(74) *Attorney, Agent, or Firm* — Nixon & Vanderhye P.C.

(57) ABSTRACT

At abnormal pressure pulsation generating time, a piston of a pulsation reducing apparatus is displaced in a valve chamber due to an increase in a fuel pressure in an upstream side fuel passage, so that fluid communication between a valve chamber and a downstream side fuel passage is disabled, and fluid communication between a valve chamber side end part of a return passage and the valve chamber is enabled. Pressure pulsation is conducted into the return passage and is reduced by a damping effect of a pulsation reducing mechanism and a flow restricting effect of orifices. The fuel, which has passed through the orifices, is returned to the upstream side fuel passage through the return passage.

10 Claims, 5 Drawing Sheets

U.S. PATENT DOCUMENTS

| | | | |
|---|---|---|---|
| 7,594,499 B2 | 9/2009 | Suzuki et al. | |
| 7,635,257 B2* | 12/2009 | Inoue | 417/540 |
| 7,640,919 B1* | 1/2010 | Smith | 123/511 |
| 7,789,071 B2* | 9/2010 | Akita et al. | 123/447 |
| 7,891,341 B2* | 2/2011 | Inoue et al. | 123/457 |
| 8,052,404 B2* | 11/2011 | Inoue | 417/505 |
| 2007/0039865 A1* | 2/2007 | Jiang et al. | 210/259 |

OTHER PUBLICATIONS

Japanese Office Action dated Apr. 5, 2011, issued in corresponding Japanese Application No. 2009-040144 with English Translation.

* cited by examiner

NORMAL TIME

ABNORMAL TIME

NORMAL TIME

ABNORMAL TIME

ABNORMAL TIME

ABNORMAL TIME

US 8,479,712 B2

PULSATION REDUCING APPARATUS

CROSS REFERENCE TO RELATED APPLICATION

This application is based on and incorporates herein by reference Japanese Patent Application No. 2009-40144 filed on Feb. 24, 2009.

BACKGROUND OF THE INVENTION

1. Field of the Invention

The present invention relates to a pulsation reducing apparatus that reduces pressure pulsation, which is generated and conducted in a fuel passage due to operation of a fuel pump.

2. Description of Related Art

For instance, a known common rail fuel injection system includes an accumulator (a common rail) that supplies high pressure fuel to fuel injection valves installed to cylinders of a diesel engine of a vehicle. The fuel injection system further includes a low pressure pump and a high pressure pump. The low pressure pump pumps fuel out of a fuel tank. The high pressure pump pressurizes and discharges the fuel, which is supplied from the low pressure pump, to the common rail. Normally, a filter is provided in the fuel passage, which connects between the fuel tank and the low pressure pump, to filter contaminants contained in the fuel.

Lately, it is often reported from users that a quality of the fuel is deteriorated (more specifically, for example, the amount of contaminants in the fuel being increased), thereby causing clogging of the filter. When the clogging of the filter occurs, the fuel pressure on the downstream side of the filter is substantially reduced (thereby resulting in an increase in a negative pressure). When the negative pressure is increased, air bubbles may possibly be generated in the fuel. When the air bubbles are pressurized by the high pressure pump along with the fuel, the quality of the fuel may possibly be deteriorated due to an increase in the fuel temperature. In order to avoid such a disadvantage, it is desirable to replace the filter upon occurrence of the clogging of the filter. However, due to the deterioration of the quality of the fuel, the life of the filter is disadvantageously shortened, so that the frequency of the filter replacement is disadvantageously increased. It is conceivable to increase a pore size (also referred to as a mesh size) of the filter to avoid the clogging of the filter. However, the increase in the pore size of the filter disadvantageously results in a reduction in a filtration efficiency of the filter.

In view of the above disadvantages, a common rail fuel injection system, which includes a prefilter and a main filter, has been developed. The prefilter is placed in a fuel passage, which connects between the fuel tank and the low pressure pump. The prefilter has a large pore size. The main filter is placed in a fuel passage, which connects between a fuel outlet of the low pressure pump and a fuel inlet of the high pressure pump. The main filter has a pore size, which is smaller than that of the prefilter. This type of common rail fuel injection system has been put into practical use. Specifically, the fuel, from which the contaminants are removed by the prefilter, is supplied to the main filter by the low pressure pump. Then, the fuel, from which the contaminants are further removed by the main filter, is supplied to the high pressure pump.

The pressure pulsation (also referred to as pressure fluctuation, pressure oscillation or pressure surge) of the fuel is generated in the fuel pump due to the operation of the low pressure pump. In a case of a fuel injection system, which is installed in a construction machine (e.g., an excavator), the fuel tank may possibly be refueled in an environment where contaminants (e.g., dust) are present in the large amount and are floating in the air as the dust blast, there is a high possibility that the contaminants are supplied into the fuel tank along with the fuel. Therefore, even in the case of the above-discussed fuel injection system, which includes the prefilter having the large pore size, the clogging of the prefilter may possibly occur. In such a case, as discussed above, the air bubbles may be generated in the fuel due to the increase in the negative pressure on the downstream side of the prefilter. When the air bubbles are drawn into and compressed in the low pressure pump along with the fuel, the pressure pulsation may possibly be abnormally increased. Furthermore, in a case where the excavator is operated at a highland (high altitude), the air bubbles can be easily mixed into the fuel due to the low atmospheric pressure. The inclusion of the air bubbles in the fuel may possibly cause the abnormally increased pressure pulsation. Furthermore, in a case where the inclusion of the air bubbles into the fuel is likely to occur due to a reduction in the airtightness of the fuel passage on the upstream side of the low pressure pump, the pressure pulsation may possibly be abnormally further increased. In the case where the pressure pulsation is abnormally increased, when such a pressure pulsation is conducted to the main filter, the main filter may possibly be damaged.

In order to avoid the above disadvantage, it has been proposed to place a damper in the fuel passage, which connects between the low pressure pump and the main filter and/or to use a rubber conduit to form the fuel passage. Japanese Unexamined Patent Publication No. H06-101793A teaches an active pulsation reducing apparatus, which addresses the above disadvantage and uses a piezoelectric element that is driven based on a measurement signal of a pressure sensor, which indicates pressure pulsation in a fluid conduit, to drive a piston placed in a casing communicated with the interior of the fluid conduit and thereby to provide a counteracting pressure for the pressure pulsation.

However, the countermeasures, such as the provision of the damper and the use of the rubber conduit, can reduce only the small amount of the abnormally increased pressure pulsation. Therefore, the reliability of the main filter may possibly be deteriorated. In the case of the Japanese Unexamined Patent Publication No. H06-101793A, the costs may possibly be disadvantageously increased due to the complex structure of the active pulsation reducing apparatus.

Thus, there is a substantial need for improving the technique in order to reduce the abnormal pressure pulsation.

The disadvantage is not limited to the system having the main filter. Specifically, in the case of the fuel supply system of the internal combustion engine that includes the fuel pump, which pumps the fuel from the fuel tank, and the predetermined fuel receiving subject device, to which the fuel is supplied from the fuel pump through the fuel passage, the function of the predetermined fuel receiving subject device may possibly be damaged in the case where the pressure pulsation is generated due to the operation of the fuel pump and is conducted through the fuel passage.

SUMMARY OF THE INVENTION

The present invention addresses the above disadvantages. Thus, it is an objective of the present invention to provide a pulsation reducing apparatus that appropriately reduces pressure pulsation of fuel, which is generated and conducted in a fuel passage due to operation of a fuel pump.

To achieve the objective of the present invention, there is provided a pulsation reducing apparatus for a fuel supply system of an internal combustion engine that includes a fuel pump, which pumps fuel out of a fuel tank, and a subject device, which receives the pumped fuel from the fuel pump through a fuel passage. The pulsation reducing apparatus is adapted to reduce pressure pulsation of the fuel, which is generated and conducted in the fuel passage due to operation of the fuel pump. The pulsation reducing apparatus includes a passage cross-sectional area reducing means for reducing a passage cross-sectional area of the fuel passage when a pressure of the fuel in the fuel passage becomes equal to or higher than a predetermined pressure. The passage cross-sectional area reducing means is placed in the fuel passage. Here, as discussed above, the passage cross-sectional area of the fuel passage is reducible by the passage cross-sectional area reducing means, and it should be noted that the reduction of the passage cross-sectional area of the fuel passage by the passage cross-sectional area reducing means may include the reduction of the passage cross-sectional area to zero or higher than zero. That is, as long as the passage cross-sectional area of the fuel passage is made smaller than that of the normal time (i.e., the time of occurrence of the fuel pressure less than the predetermined pressure), the passage cross-sectional area is considered to be reduced. In the case where the passage cross-sectional area of the fluid passage is reduced to zero, the fuel passage is completely closed, i.e., blocked to limit the conduction of the pressure pulsation to the subject device, such as a filter. However, this complete closure of the fuel passage may be intermittently executed, for example, only at the peaks of the pressure pulsation (at the time of occurrence of peak pressure of the pressure pulsation, which is equal to or higher than the predetermined pressure).

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION (First Embodiment)

A pulsation reducing apparatus according to a first embodiment of the present invention will be described with reference to FIGS. 1 to 3B. In the present embodiment, the pulsation reducing apparatus is implemented in a common rail fuel injection system of a diesel engine (serving as an internal combustion engine of the present invention) installed in a construction machine, more specifically, an excavator (serving as a vehicle).

Figure 1:
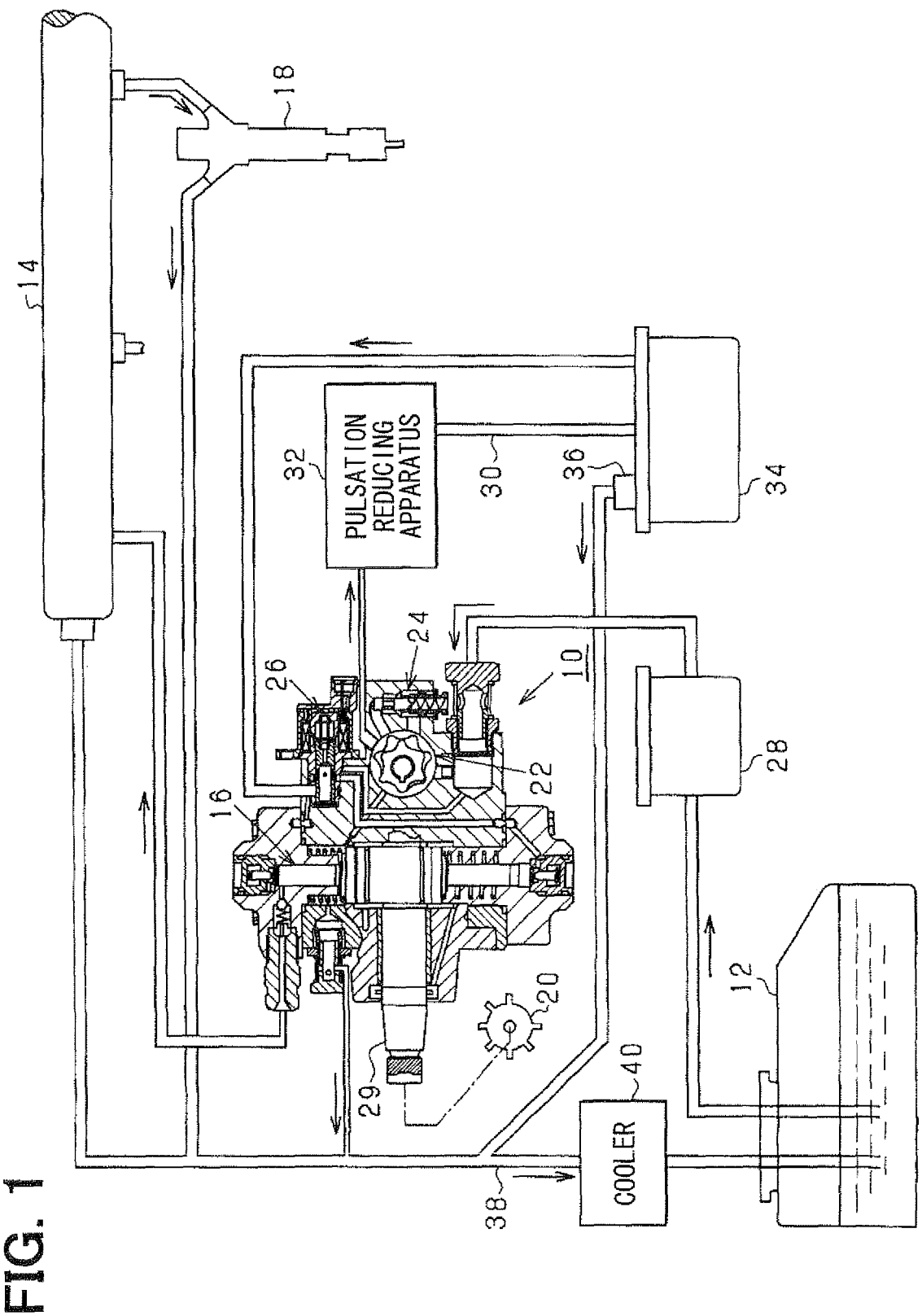
FIG. 1 is a schematic diagram showing an entire structure of a fuel injection system according to a first embodiment of the present invention.

FIG. 1 shows a structure of the system of the present embodiment.

In the system, a high pressure fuel pump 10 pressurizes and discharges fuel, which is drawn from a fuel tank 12, toward a common rail 14. Here, the common rail 14 is an accumulator, which accumulates the fuel received from a high pressure pump 16 under the high pressure and supplies the accumulated fuel to fuel injection valves 18, which are provided to cylinders of the diesel engine. The high pressure fuel pump 10 is an engine driven pump, which is driven by a rotational force of a crankshaft 20 of the diesel engine. The high pressure fuel pump 10 includes a feed pump 22, a regulator valve (pressure regulator valve) 24, an intake metering valve 26 and the high pressure pump 16.

The feed pump 22 of the high pressure fuel pump 10 draws fuel out of the fuel tank 12 through a prefilter 28, which filters contaminants (foreign objects, such as debris, dust, sand) contained in the fuel. The feed pump 22 is a trochoid pump, which is driven by a rotational force of a drive shaft 29 and serves as a low pressure pump. The drive shaft 29 is driven by the rotational force transmitted from the crankshaft 20 of the diesel engine. Here, it should be noted that an electric pump may be interposed between the prefilter 28 and the feed pump 22 to limit an increase in the pressure loss of fuel, which would be caused by the prefilter 28.

The regulator valve 24 is placed at a fuel outlet of the feed pump 22. The regulator valve 24 is a valve, which adjusts a discharge pressure of the feed pump 22 to a predetermined pressure or less through adjustment of an opening degree thereof with a piston and a spring when the discharge pressure of the feed pump 22 becomes above the predetermined pressure.

A fuel passage 30 is placed outside of the high pressure fuel pump 10 and is connected to the high pressure fuel pump 10. The feed pump 22 discharges the fuel to the fuel passage 30 through the regulator valve 24. A pulsation reducing apparatus 32 and a main filter (fuel filter that serves as a predetermined fuel receiving subject device) 34 are provided in the fuel passage 30.

The main filter 34 removes the contaminants contained in the fuel, which is pumped from the feed pump 22. The main filter 34 is provided to minimize the pressure loss of the fuel at the prefilter 28. Specifically, for example, when the fuel tank 12 is refueled in an environment where contaminants (e.g., dust) are present in the large amount and are floating in the air as the dust blast, there is a high possibility that the contaminants are supplied into the fuel tank 12 along with the fuels. When a pore size (also referred to as a mesh size) of the prefilter 28 is reduced to improve a filtration efficiency for the contaminants in order to filter the contaminants solely with the prefilter 28, clogging of the prefilter 28 is likely to occur. In such a case, a pressure loss is disadvantageously increased to cause an increase in a negative pressure (a vacuum pressure) due to the clogging of the prefilter 28, and thereby air bubbles tend to be generated in the fuel. In view of the above disadvantage, a filterable particle size of the contaminants, which can be filtered, i.e., captured with the prefilter 28, is appropriately set to a corresponding size (e.g., 10 μm) that will not cause a deterioration in the reliability of the feed pump 22 through the clogging of the contaminants contained in the fuel. In this way, the increase in the negative pressure is limited or minimized. In addition, the filterable particle size of the contaminants, which can be filtered, i.e., captured with the main filter 34, is set to a size (e.g., 2 μm) that is smaller than that of the prefilter 28. In this way, the filtration efficiency is improved. Thereby, the contaminants in the fuel can be effectively removed while minimizing the pressure loss at the prefilter 28.

The fuel, which has passed through the main filter 34, is supplied to the intake metering valve 26 of the high pressure fuel pump 10 through the fuel passage 30. The intake metering valve 26 is an electronically controlled valve, which meters the amount of fuel drawn into the high pressure pump 16. The high pressure pump 16 is a plunger pump, which is driven by the rotational force of the drive shaft 29. The high pressure pump 16 pressurizes the fuel, which is metered through the intake metering valve 26, and then discharges the pressurized fuel to the outside (more specifically, the common rail 14).

A relief valve 36 is provided to the main filter 34. In order to avoid a damage to the main filter 34, which would be caused by an abnormally high pressure of the fuel in the main filter 34, when the fuel pressure becomes equal to or higher than a predetermined pressure, the relief valve 36 discharges the fuel to the outside of the main filter 34.

The fuel, which is discharged from the relief valve 36, the leak fuel, which is discharged from the fuel injection valves 18, and the excess fuel of the high pressure fuel pump 10 are returned to the fuel tank 12 through a fuel return passage 38 and a fuel cooler 40.

Figure 2:
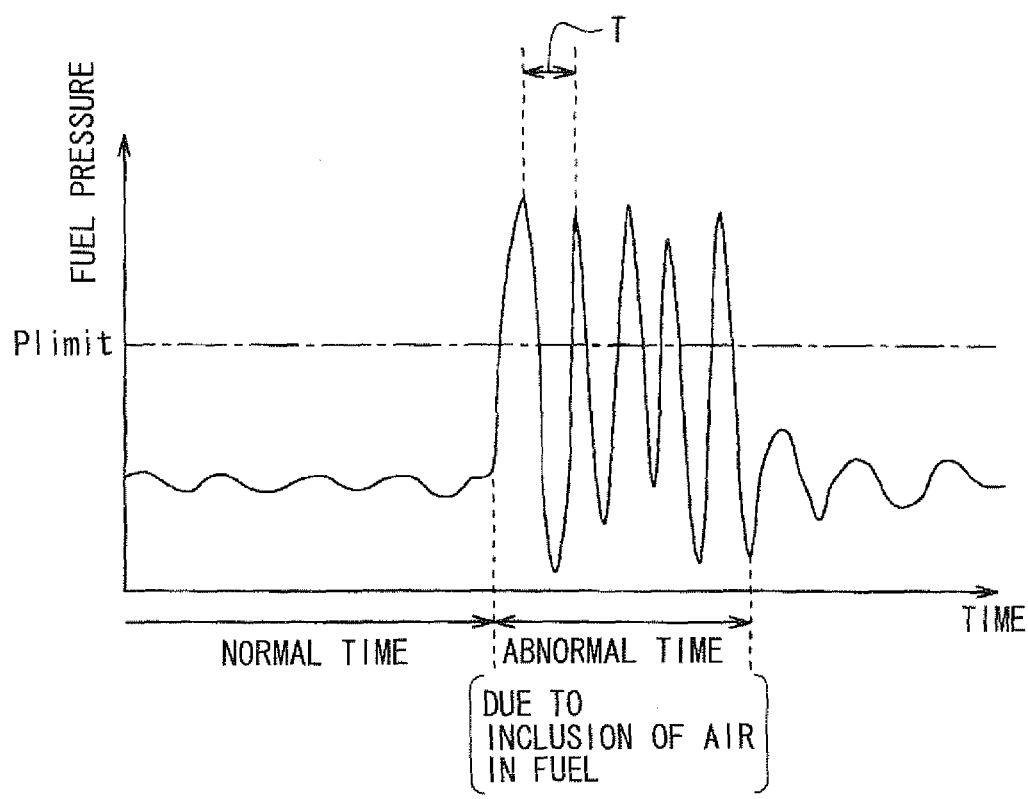
FIG. 2 is a diagram showing a time chart that exemplary indicates abnormal pressure pulsation, which occurs on an upstream side of a main filter and is addressed in the first embodiment.

Pressure pulsation of the fuel may be generated in the high pressure fuel pump 10 due to a structural reason of the feed pump 22. Specifically, when an inner rotor and an outer rotor are driven in the feed pump 22 to draw and discharge the fuel, the pressure pulsation of the fuel is generated. The pressure pulsation may become abnormally large to cause the abnormal pressure pulsation when the air bubbles (sometimes, simply referred to as air) are mixed in the fuel, which is drawn by the feed pump 22. Specifically, when the air bubbles are drawn into the feed pump 22 along with the fuel, the following events are expected. That is, the amount of the fuel drawn into the feed pump 22 becomes inconstant, i.e., is fluctuated, and the drawn air bubbles are compressed in the feed pump 22. When these events occur, the abnormal pressure pulsation is generated. FIG. 2 shows a waveform of the pressure pulsation of the fuel, which is measured on the upstream side of the main filter 34 and is conducted through the fuel passage 30. As shown in FIG. 2, the behavior of the fuel pressure (amplitude of the fluctuation in the fuel pressure) in the case of occurrence of the abnormal pressure pulsation (abnormal pressure pulsation generating time, i.e., abnormal time) is substantially larger than the behavior of the fuel pressure in the case of non-occurrence of the abnormal pressure pulsation (normal operational time, i.e., normal time).

The factors, which cause the inclusion of the air bubbles into the fuel, may include the following factors. One factor is the clogging of the prefilter 28. Specifically, when the clogging of the prefilter 28 occurs, the pressure loss of the fuel at the time of passing through the prefilter 28 becomes large, and thereby the air bubbles are mixed into the fuel, which is drawn into the feed pump 22. Another factor is the operational environment of the excavator. Specifically, in a case where the excavator is operated at a highland (high altitude), the air bubbles can be easily mixed into the fuel due to the low atmospheric pressure. Another factor is the airtightness of the fuel passage on the upstream side of the feed pump 22. Specifically, when the airtightness of the fuel passage on the upstream side of the feed pump 22 is reduced, the air can be easily mixed into the fuel.

In a case where the abnormal pressure pulsation, which is generated upon the operation of the feed pump 22, is conducted to the regulator valve 24, the movement of the piston in the regulator valve 24 becomes unstable (resulting in hunting of the piston). This unstable movement of the piston in the regulator valve 24 may possibly promote the generation of the abnormal pressure pulsation.

The abnormal pressure pulsation is conducted from the upstream side to the downstream side in the flow path of the fuel. Therefore, this abnormal pressure pulsation may possibly be conducted to the main filter 34. When the fuel pressure acting on the main filter 34 is increased beyond a tolerable upper pressure limit (Plimit in FIG. 2) due to the abnormal pressure pulsation, it may possibly cause a damage of the main filter 34 (e.g., rupturing of a filter paper, detachment of a filter cartridge). When the main filter 34 is damaged, debris of the damaged filter 34 may be supplied to the intake metering valve 26 and/or the high pressure pump 16 of the high pressure fuel pump 10 along with the fuel. The supplied debris of the damaged filter 34 may possibly be caught in the metering valve 26 and/or the high pressure pump 16 to cause malfunctions of the metering valve 26 and/or the high pressure pump 16, thereby deteriorating the reliability of the entire fuel injection system.

In view of the above point, according to the present embodiment, as shown in FIG. 1, the pulsation reducing apparatus 32 discussed above is placed on the upstream side of the main filter 34 in the fuel passage 30 to limit the conduction of the abnormal pressure pulsation to the main filter 34.

Figure 3A:
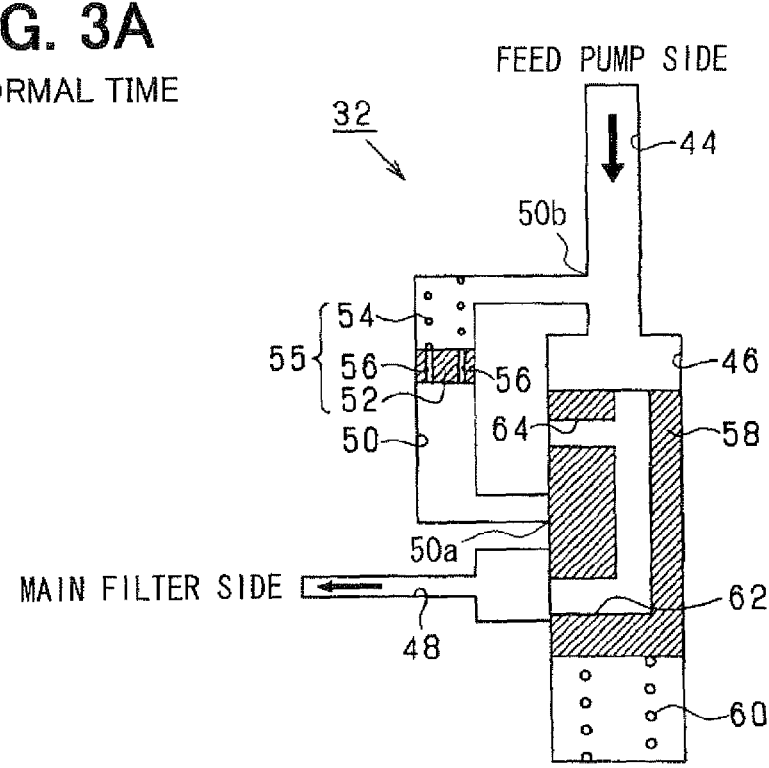
FIG. 3A is a schematic cross-sectional view showing an operational state of a pulsation reducing apparatus of the first embodiment in a normal operational time (normal time)
Figure 3B:
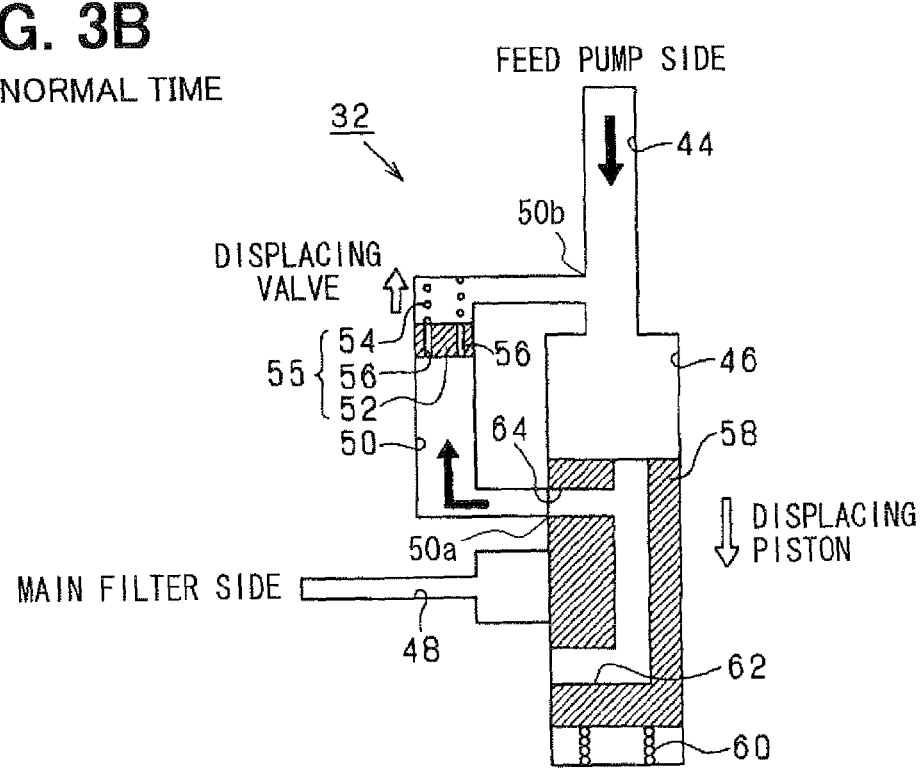
FIG. 3B is a schematic cross-sectional view showing another operational state of the pulsation reducing apparatus of the first embodiment in an abnormal pressure pulsation generating time (abnormal time)

FIGS. 3A and 3B are cross-sectional views showing the structure of the pulsation reducing apparatus 32 of the present embodiment. Specifically, FIG. 3A is a cross-sectional view showing the pulsation reducing apparatus 32 in the normal operational time, and FIG. 3B is a cross-sectional view showing the pulsation reducing apparatus 32 in the abnormal pressure pulsation generating time.

First of all, the structure of the pulsation reducing apparatus 32 will be described with reference to FIG. 3A. As shown in FIG. 3A, the pulsation reducing apparatus 32 includes an upstream side fuel passage 44, a valve chamber 46 and a downstream side fuel passage 48, which may cooperate together to serve as a part of the fuel passage between the feed pump 22 and the main filter 34. An upstream end part of the upstream side fuel passage 44 is connected to an upstream side section of the fuel passage 30, which is located on the upstream side of the pulsation reducing apparatus 32 where the feed pump 22 is located. An upstream end part of the valve chamber 46 is connected to a downstream end part of the upstream side fuel passage 44. An upstream end part of the downstream side fuel passage 48 is connected to a downstream end part of the valve chamber 46. A downstream end part of the downstream side fuel passage 48 is connected to a downstream side section of the fuel passage 30, which is located on the downstream side of the pulsation reducing apparatus 32 where the main filter 34 is located.

The upstream side fuel passage 44 and the valve chamber 46 are also connected with each other through a return passage (also referred to as a connection passage) 50. The valve chamber 46 is connected to a valve chamber 46 side end part (connection) 50a of the return passage 50. The upstream side fuel passage 44 is connected to an upstream side fuel passage 44 side end part (connection) 50*b* of the return passage 50. A pressure pulsation reducing mechanism 55 is provided in the return passage 50. The pressure pulsation reducing mechanism 55 includes a spool valve (a valve member) 52 and a spring (a resilient element or resilient member) 54. The spool valve 52 is configured into a generally cylindrical tubular form and is slidable along a wall of the return passage 50. The spring 54 is resiliently displaceable in a sliding direction of the spool valve 52 and is adapted to exert a resilient force against the spool valve 52 to displace the same toward the valve chamber 46 side in the return passage 50. One end portion of the spring 54 is connected to the spool valve 52, and the other end portion of the spring 54 is fixed to the wall of the return passage 50. Restriction orifices (valve holes) 56 are formed through the spool valve 52 to communicate the return passage 50 therethrough. The orifices 56 are sufficiently choked to implement a flow restricting function thereof to cause a pressure drop across the orifices 56. In other words, a total cross-sectional area of the orifices 56 is less than a cross sectional area of an adjacent part of the return passage 50, which is located on the upstream side or downstream side of the orifices 56.

The valve chamber 46 receives a piston 58 and a valve chamber spring (a resilient element or resilient member) 60. The piston 58 is configured into a generally cylindrical tubular form and is slidable along a wall of the valve chamber 46. The valve chamber spring 60 is resiliently displaceable in a sliding direction of the piston 58 and is adapted to exert a resilient force against the piston 58 to displace the same toward the upstream side fuel passage 44. The piston 58 and the valve chamber spring 60 serve as a passage cross-sectional area reducing means.

A main passage 62 and a sub-passage 64 are formed in the piston 58. The main passage 62 is a passage that enables or disables fluid communication between the valve chamber 46 (more specifically, the upstream side fuel passage 44 side part of the valve chamber 46) and the downstream side fuel passage 48 depending on the operational position of the piston 58 in the valve chamber 46. The sub-passage 64 is a passage that enables or disables fluid communication between the valve chamber 46 (more specifically, the upstream side fuel passage 44 side part of the valve chamber 46) and the valve chamber 46 side end part 50*a* of the return passage 50 depending on the operational position of the piston 58 in the valve chamber 46.

Next, the operation of the pulsation reducing apparatus 32 of the present embodiment will be described.

At the normal operational time, as shown in FIG. 3A, the piston 58 is placed in a position (a normal time position), at which the valve chamber 46 and the downstream side fuel passage 48 are communicated with each other through the main passage 62. This position is implemented by the resilient force of the valve chamber spring 60 that acts against a force, which is applied to the piston 58 by the pressure of the fuel supplied from the valve chamber 46 side (from the upstream side fuel passage 44), to limit displacement of the piston 58 from the normal time position to a position, at which the fluid communication between the valve chamber 46 and the downstream side fuel passage 48 is disabled. In this way, the fuel, which is pumped by the feed pump 22, can be supplied to the main filter 34 through the upstream side fuel passage 44, the main passage 62 and the downstream side fuel passage 48.

In contrast, at the abnormal pressure pulsation generating time, as shown in FIG. 3B, the piston 58 is placed in a position (an abnormal time position), at which the valve chamber 46 side end part 50*a* of the return passage 50 and the valve chamber 46 are communicated with each other through the sub-passage 64. This position is implemented by an increase in the fuel pressure in the upstream side fuel passage 44, which causes an increase in the force applied to the piston 58 toward this position (the abnormal time position), at which the valve chamber 46 side end part 50*a* of the return passage 50 and the valve chamber 46 are communicated with each other through the sub-passage 64, beyond the resilient force of the valve chamber spring 60. In this way, the fluid communication between the valve chamber 46 and the downstream side fuel passage 48 is disabled. That is, the passage cross-sectional area of the fluid passage between the feed pump 22 and the main filter 34 is reduced to zero temporarily or instantaneously due to the application of the abnormally high pressure of the fuel, which is equal to or higher than the predetermined pressure, on the piston 58 on the feed pump 22 side thereof. Thereby, the conduction of the abnormal pressure pulsation from the feed pump 22 side toward the main filter 34 side can be effectively limited.

At this time, since the fluid communication between the return passage 50 and the sub-passage 64 is enabled, the abnormal pressure pulsation is conducted to the return passage 50 through the sub-passage 64. The abnormal pressure pulsation, which is guided into the return passage 50, acts against the spool valve 52 to displace the spool valve 52 against the resilient force of the spring 54. In this way, the spool valve 52 is oscillated by a resultant force, which is produced by the resilient force of the spring 54 and the force of the abnormal pressure pulsation. This oscillation of the spool valve 52 acts as damping oscillation because of a viscous force applied to the spool valve 52 from the surrounding fuel and a frictional force applied to the spool valve 52 from a wall of the return passage 50. In this way, the pressure pulsation reducing mechanism 55 exerts the damping effect, which reduces the pressure pulsation. The abnormal pressure pulsation is also reduced by passing the abnormal pressure pulsation through the orifices 56 formed in the spool valve 52 (a restriction effect). The fuel, which has passed through the orifices 56, is returned to the upstream side fuel passage 44 through the return passage 50.

As discussed above, the pressure pulsation reducing mechanism 55 provides the pressure pulsation reducing effect, and the return passage 50 enables the returning of the fuel to the upstream side fuel passage 44. Thus, it is possible to rapidly reduce the fuel pressure on the upstream side of the piston 58 where the upstream side fuel passage 44 is located, and thereby it is possible to rapidly return to the normal state shown in FIG. 3A.

Desirably, a flow passage cross-sectional area of the downstream side fuel passage 48 at the connection between the valve chamber 46 and the downstream side fuel passage 48 is set to be larger than a flow passage cross-sectional area of the main passage 62. This setting is desirable to avoid closing of a portion of the flow passage in the main passage 62 by a wall surface of the valve chamber 46 upon occurrence of small movement of the piston 58 caused by the pressure pulsation of the fuel in the normal operational time.

Furthermore, desirably, the characteristics of the valve chamber spring 60 (e.g., the resilient force of the valve chamber spring 60 applied to the piston 58, the spring constant of the valve chamber spring 60) are set to appropriate ones, which enable the rapid disconnection of the fluid communication between the valve chamber 46 and the downstream side fuel passage 48 upon the application of the abnormal pressure pulsation to the piston 58.

Also, desirably, the characteristics of the spring 54 (e.g., the resilient force of the spring 54 applied to the spool valve 52, the spring constant of the spring 54) are set based on a period T of the pressure pulsation of the fuel shown in FIG. 2. Specifically, desirably, a natural period of the damping oscillation of the spool valve 52 and the period T are coincided with each other, and the spool valve 52 is oscillated at an appropriate phase, which is appropriate for reducing the abnormal pressure pulsation. In this way, the damping effect can be appropriately achieved. Here, the period T of the fuel pressure pulsation may vary depending on the rotational speed of the diesel engine. Therefore, desirably, the characteristics of the spring 54 are set (adapted) based on the period of the pressure pulsation of the fuel at the rotational speed of the diesel engine, which likely induces the abnormal pressure pulsation, specifically at the high rotational speed of the diesel engine, which likely induces the increase in the negative pressure due to the increase in the intake amount of the fuel at the feed pump 22.

Furthermore, the orifices 56, which are formed in the spool valve 52, have the influences on the flowability of the fuel in the return passage 50 and the above-discussed flow restricting effect as well as the damping effect of the pressure pulsation reducing mechanism 55. Therefore, desirably, the cross-sectional area of each orifice 56 and the number of the orifice(s) 56 are set based on the flow rate of the fuel in the return passage 50 as well as the requirement(s) for reducing the abnormal pressure pulsation through use of the damping effect and the flow restricting effect discussed above.

The present embodiment provides the following advantages.

(1) At the abnormal pressure pulsation generating time, the piston 58 is displaced due to the increase in the fuel pressure in the upstream side fuel passage 44 to disable the fluid communication between the valve chamber 46 and the downstream side fuel passage 48. In this way, it is possible to appropriately limit the abnormal pressure pulsation, which is conducted through the fuel passage 30 from the feed pump 22 side to the main filter 34 side, and thereby it is possible to appropriately avoid the damage of the main filter 34 and the deterioration of the reliability of the fuel injection system caused by such a damage of the main filter 34.

(2) The fluid communication between the valve chamber 46 side end part 50a of the return passage 50 and the valve chamber 46 through the sub-passage 64 is enabled by disabling the fluid communication between the valve chamber 46 and the downstream side fuel passage 48, so that the abnormal pressure pulsation is guided into the return passage 50, and this abnormal pressure pulsation is reduced by the damping effect of the pressure pulsation reducing mechanism 55 and the flow restricting effect of the orifices 56. Furthermore, the fuel, which has passed through the orifices 56, is returned to the upstream side fuel passage 44 through the return passage 50. In this way, the fuel pressure on the upstream side of the piston 58 where the upstream side fuel passage 44 is located can be rapidly reduced, and thereby the piston 58 can be immediately displaced to the position, at which the fluid communication between the valve chamber 46 and the downstream side fuel passage 48 is enabled. Therefore, the reduction in the amount of the fuel supplied to the main filter 34 can be appropriately limited.

(3) The prefilter 28 is placed between the fuel tank 12 and the feed pump 22. In this case, the air bubbles may tented to be generated in the fuel due to the clogging of the prefilter 28 to cause the generation of the abnormal pressure pulsation. Therefore, the pulsation reducing apparatus 32 is particularly valuable.

(4) The regulator valve 24 is provided in the high pressure fuel pump 10. When the abnormal pressure pulsation, which is generated due to the operation of the feed pump 22, is conducted to the regulator valve 24, the generation of the abnormal pressure pulsation is likely promoted. Therefore, in the present embodiment where the regulator valve 24 is provided in the high pressure fuel pump 10, the pulsation reducing apparatus 32 is particularly valuable.

(Second Embodiment)

A second embodiment of the present invention will be described mainly with respect to features, which are different from the first embodiment, in view of FIGS. 4A to 4C.

Figure 4A:
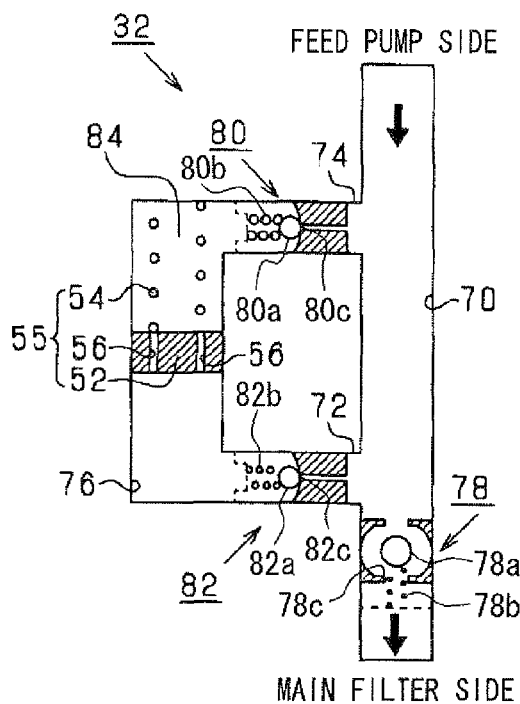
FIG. 4A is a schematic cross-sectional view showing an operational state of a pulsation reducing apparatus of a second embodiment of the present invention in a normal operational time.
Figure 4B:
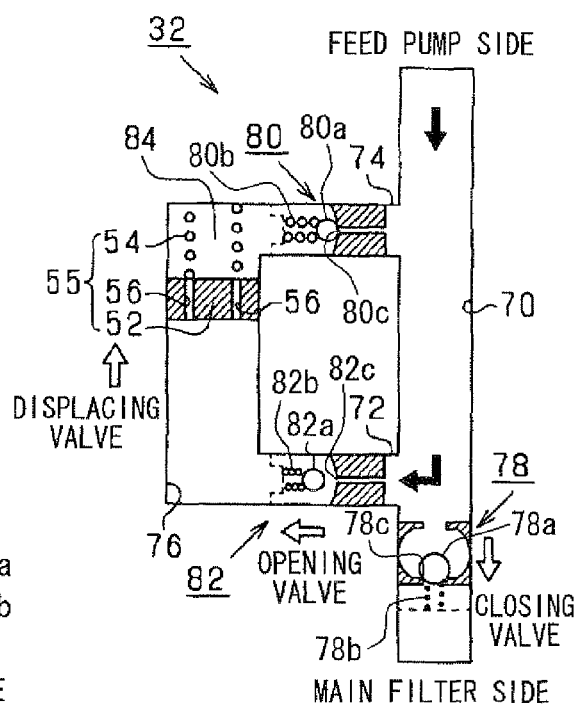
FIG. 4B is a schematic cross-sectional view showing another operational state of the pulsation reducing apparatus of the second embodiment in an abnormal pressure pulsation generating time.
Figure 4C:
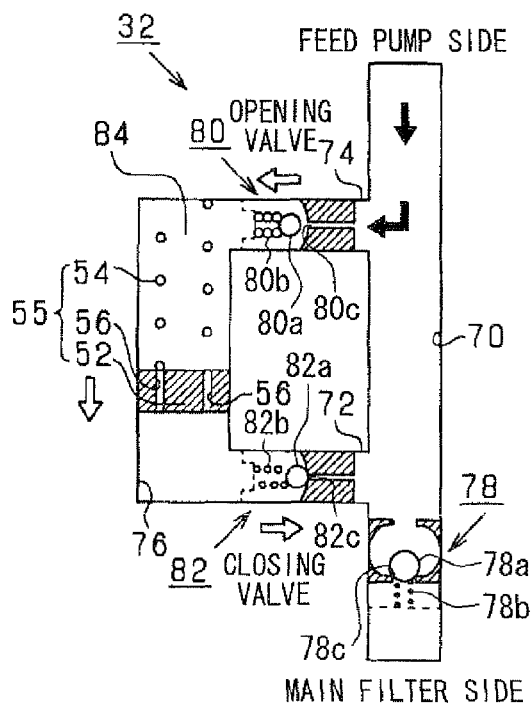
FIG. 4C is a schematic cross-sectional view showing another operational state of the pulsation reducing apparatus of the second embodiment in the abnormal pressure pulsation generating time.

FIGS. 4A to 4C are cross-sectional views showing the structure of the pulsation reducing apparatus 32 of the present embodiment. Specifically, FIG. 4A is a cross-sectional view showing the pulsation reducing apparatus 32 in the normal operational time, and FIGS. 4B and 4C are cross-sectional views showing the pulsation reducing apparatus 32 in the abnormal pressure pulsation generating time. In FIGS. 4A to 4C, the components, which are similar to those of the first embodiment shown in FIGS. 1, 3A and 3B, will be indicated by the same reference numerals.

First of all, the structure of the pulsation reducing apparatus 32 will be described with reference to FIG. 4A. As shown in FIG. 4A, the pulsation reducing apparatus 32 includes a main fuel passage 70, which communicates between the feed pump 22 side and the main filter 34 side and thereby serves as a part of the fuel passage between the feed pump 22 and the main filter 34.

The main fuel passage 70 includes two branch portions, which are branched from the main fuel passage 70. Specifically, the main fuel passage 70 includes a downstream side branch portion (connection) 72 and an upstream side branch portion (connection) 74. The downstream side branch portion 72 is located at the main filter 34 side part in the main fuel passage 70, and the upstream side branch portion 74 is located at the feed pump 22 side part in the main fuel passage 70. The upstream side branch portion 74 is connected to the downstream side branch portion 72 through a connection passage 76, which is branched from the main fuel passage 70.

A main valve 78 is provided on the main filter 34 side of the downstream side branch portion 72 in the main fuel passage 70. The main valve 78 disables the fluid communication between the downstream side branch portion 72 and the main filter 34 in the main fuel passage 70 when the fuel pressure on the upstream side of the main valve 78 where the downstream side branch portion 72 is located in the main fuel passage 70 becomes equal to or higher than the predetermined pressure. Specifically, when the fuel pressure, which is applied to a valve element 78a of the main valve 78 on the upstream side thereof against a resilient force of a spring 78b that urges the valve element 78a toward the feed pump 22 side, becomes equal to or higher than the predetermined pressure, the valve element 78a is seated against a valve seat 78c to disable the flow of the fuel through a passage located radially inward of the valve seat 78c. The main valve 78 serves as a passage cross-sectional area reducing means.

An upstream side valve 80, which is a check valve, is provided at a portion of the connection passage 76, which is adjacent to the upstream side branch portion 74. The upstream side valve 80 passes the fuel from the upstream side branch portion 74 of the main fuel passage 70 to the connection passage 76 when a pressure difference between the fuel pressure on the upstream side of the upstream side valve 80 and the fuel pressure on the downstream side of the upstream side valve 80 becomes equal to or higher than a predetermined pressure (a valve opening pressure of the upstream side valve 80). Specifically, when the fuel pressure, which is applied to a valve element 80a of the upstream side valve 80 on the main passage 70 side thereof against a resilient force of a spring 80b that urges the valve element 80a toward the main passage 70, becomes equal to or higher than a predetermined pressure, the valve element 80a is lifted away from a valve seat 80c to enable the flow of the fuel through a passage located radially inward of the valve seat 80c. A downstream side valve 82, which is a check valve, is provided at a portion of the connection passage 76, which is adjacent to the downstream side branch portion 72. The downstream side valve 82 passes the fuel from the downstream side branch portion 72 of the main fuel passage 70 to the connection passage 76 when a pressure difference between the fuel pressure on the upstream side of the downstream side valve 82 and the fuel pressure on the downstream side of the downstream side valve 82 becomes equal to or higher than a predetermined pressure (a valve opening pressure of the downstream side valve 82). Specifically, when the fuel pressure, which is applied to a valve element 82a of the downstream side valve 82 on the main passage 70 side thereof against a resilient force of a spring 82b that urges the valve element 82a toward the main passage 70, becomes equal to or higher than a predetermined pressure, the valve element 82a is lifted away from a valve seat 82c to enable the flow of the fuel through a passage located radially inward of the valve seat 82c.

The pressure pulsation reducing mechanism 55, which is similar to the pressure pulsation reducing mechanism 55 shown in FIGS. 3A and 3B, is provided in the connection passage 76. A pressure changing chamber 84 is formed in the connection passage 76. The pressure changing chamber 84 is a space, which is defined between the spool valve 52 and the upstream side valve 80 in the connection passage 76.

Next, the operation of the pulsation reducing apparatus 32 of the present embodiment will be described.

At the normal operational time, as shown in FIG. 4A, the main valve 78 is opened to enable the fluid communication between the upstream side (the feed pump 22 side) of the main valve 78 and the downstream side (the main filter 34 side) of the main valve 78. This is made possible since the above-described predetermined pressure, equal to or above which the main valve 78 is closed to disable the fluid communication between the feed pump 22 and the main filter 34, is set to be higher than the pressure (normal pressure) of the fuel, which is supplied to the main valve 78 from the feed pump 22 side at the normal operational time. At this time (normal time), the downstream side valve 82 and the upstream side valve 80 are not opened. This is made possible since the valve opening pressure of the downstream side valve 82 is set to be equal to or higher than the predetermined pressure, equal to or above which the main valve 78 is closed, and the valve opening pressure of the upstream side valve 80 is set to be higher than the valve opening of the downstream side valve 82. In this way, the fuel, which is pumped by the feed pump 22, can be supplied to the main filter 34 through the main fuel passage 70 during the normal operational time.

In contrast, as shown in FIG. 4B, at the abnormal pressure pulsation generating time (abnormal time), the main valve 78 is closed to disable the fluid communication between the feed pump 22 side of the main valve 78 and the main filter 34 side of the main valve 78. In this way, it is possible to appropriately limit the conduction of the abnormal pressure pulsation from the feed pump 22 side to the main filter 34 side.

When the downstream side valve 82 is opened, the fluid communication between the connection passage 76 and the main fuel passage 70 is enabled. In this way, the abnormal pressure pulsation is conducted into the connection passage 76 through the downstream side valve 82. The abnormal pressure pulsation, which is conducted into the connection passage 76, is reduced by the damping effect of the pressure pulsation reducing mechanism 55 and the flow restricting effect of the orifices 56. At this time, the spool valve 52 is displaced in a volume reducing direction for reducing the volume of the pressure changing chamber 84, and thereby the resilient energy is accumulated in the spring 54. When the abnormal pressure pulsation is conducted into the connection passage 76 through the downstream side valve 82, the fuel pressure of the portion of the main fuel passage 70, which is adjacent to the downstream side valve 82, is reduced. Therefore, the downstream side valve 82 is closed. Thereby, it is possible to limit the conduction of abnormal pressure pulsation from the connection passage 76 back to the main fuel passage 70. At this time, the upstream side valve 80 is not yet opened. This is made possible since the valve opening pressure of the upstream side valve 80 is set to be higher than the valve opening pressure of the downstream side valve 82.

Thereafter, as shown in FIG. 4C, the spool valve 52 is displaced in a volume increasing direction for increasing the volume of the pressure changing chamber 84 due to the fuel pressure of the pressure changing chamber 84, which is increased due to the displacement of the spool valve 52 in the volume reducing direction, and also the accumulated resilient energy of the spring 54. When the fuel pressure of the pressure changing chamber 84 is reduced, the upstream side valve 80 is opened. Therefore, the fuel is drawn from the main fuel passage 70 into the connection passage 76 through the upstream side valve 80 (drawing effect). At this time, since the downstream side valve 82 is closed, the conduction of the abnormal pressure pulsation from the connection passage 76 back to the fuel passage 70 can be limited.

Because of the pressure pulsation reducing effect of the pressure pulsation reducing mechanism 55, the flow restricting effect of the orifices 56 and the above-described drawing effect, it is possible to actively reduce the subsequently conducted abnormal pressure pulsation. Thus, the fuel pressure on the upstream side (the upstream side branch portion 74 side) of the main valve 78 can be rapidly reduced, and thereby it is possible to rapidly return to the normal position shown in FIG. 4A.

Desirably, the characteristics of the main valve 78 (e.g., the predetermined pressure, equal to or above which the main valve 78 is closed to disable the fluid communication between the feed pump 22 side of the main valve 78 and the main filter 34 side of the main valve 78, the spring constant of the spring 78b) are set to appropriate ones, which enable the rapid disconnection of the fluid communication between the feed pump 22 side of the main valve 78 and the main filter 34 side of the main valve 78.

Also, desirably, the characteristics of the spring 54 are set based on the period T of the pressure pulsation of the fuel shown in FIG. 2. Specifically, desirably, the natural period of the damping oscillation of the spool valve 52 and the period T are coincided with each other, and the spool valve 52 is oscillated at the appropriate phase, which is appropriate for implementing the above drawing effect at the time of increasing of the fuel pressure at the portion of the main fuel passage 70, which is adjacent to the upstream side valve 80, due to the conduction of the abnormal pressure pulsation upon the closing of the main valve 78. In this way, the above drawing effect can be appropriately achieved.

Furthermore, a fine fuel passage (for the purpose of reducing the airtightness of the downstream side valve 82) may be provided to always communicate between the connection passage 76 and the main fuel passage 70. This is for the purpose of avoiding the excessive increase in the fuel pressure in the connection passage 76 upon conduction of the abnormal pressure pulsation into the connection passage 76 through the downstream side valve 82 and/or the upstream side valve 80.

In this way, according to the present embodiment, at the abnormal pressure pulsation generating time, when the fuel pressure in the main fuel passage 70 is increased, the main valve 78 is closed to limit the abnormal pressure pulsation conducted from the feed pump 22 side to the main filter 34 side. Furthermore, the closing of the downstream side valve 82 upon the conduction of the abnormal pressure pulsation into the connection passage 76, the damping effect of the pressure pulsation reducing mechanism 55, and the flow restricting effect of the orifices 56 allow the rapid reduction of the fuel pressure on the upstream side of the main valve 78. Thereby, the main valve 78 can be promptly opened. Therefore, the reduction in the amount of the fuel supplied to the main filter 34 can be appropriately limited.

(Third Embodiment)

A third embodiment of the present invention will be described mainly with respect to features, which are different from the first embodiment, in view of FIG. 5.

Figure 5:
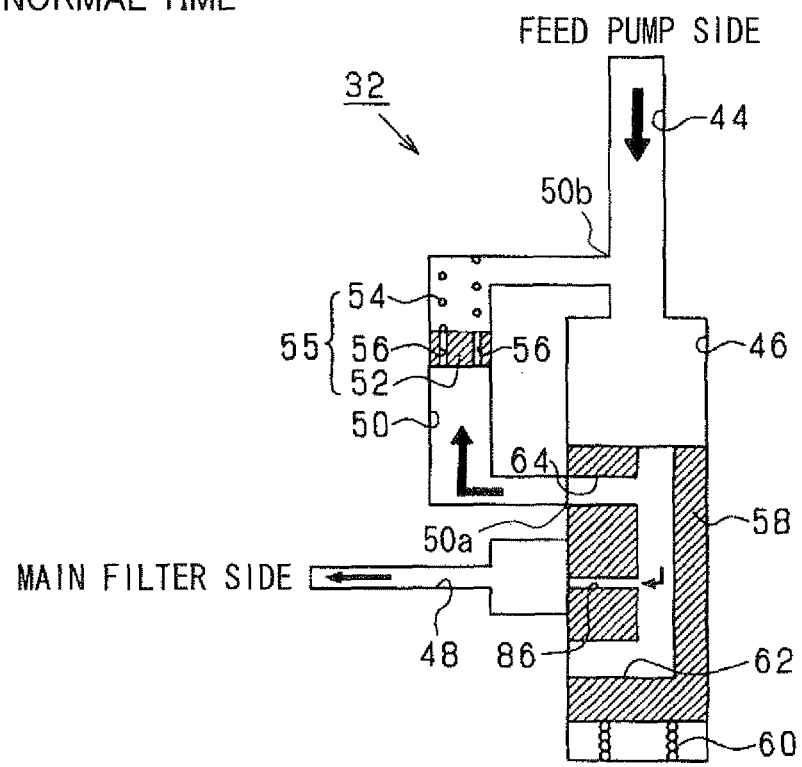
FIG. 5 is a schematic cross-sectional view showing an operational state of a pulsation reducing apparatus of a third embodiment of the present invention in an abnormal pressure pulsation generating time.

FIG. 5 is a cross-sectional view showing the structure of the pulsation reducing apparatus 32 of the present embodiment. In FIG. 5, the components, which are similar to those of the first embodiment shown in FIG. 1, will be indicated by the same reference numerals.

As shown in FIG. 5, a fine passage 86 is formed in the piston 58 to communicate between the upstream side fuel passage 44 and the downstream side fuel passage 48. Thus, at the abnormal pressure pulsation generating time, the reduction in the amount of the fuel supplied to the main filter 34 is appropriately limited while limiting the conduction of the abnormal pressure pulsation from the feed pump 22 side to the main filter 34 side.

Here, as long as the flow passage cross-sectional area of the fine passage 86 is smaller than the flow passage cross-sectional area of the main passage 62, the flow passage cross-sectional area of the fine passage 86 may be set based on the requirement(s) for reducing the abnormal pressure pulsation conducted from the feed pump 22 side to the main filter 34 side and the requirement(s) with respect to the amount of the fuel supplied to the main filter 34 at the abnormal pressure pulsation generating time.

As discussed above, according to the present embodiment, it is possible to more appropriately limit the reduction in the amount of the fuel supplied to the main filter 34 while limiting the abnormal pressure pulsation, which is conducted from the feed pump 22 side to the main filter 34 side.

The above embodiments may be modified as follows.

In the first embodiment, the fuel, which is supplied to the return passage 50, is passed through the orifices 56, which are formed in the spool valve 52, to return the fuel from the return passage 50 to the upstream side fuel passage 44. However, the present invention is not limited to this construction. For example, a radial gap may be formed between the spool valve 52 and the wall of the return passage 50 without forming the orifices 56 in the spool valve 52. An extent of the radial gap in the flow direction of the fuel (top-to-bottom direction in FIG. 5) in the return passage 50 is equal to an extent of the spool valve 52 in the flow direction of the fuel in the return passage 50 to always communicate the return passage 50 therethrough. The fuel may be passed through this gap to return the fuel, which is conducted to the return passage 50, back to the upstream side fuel passage 44. Further alternatively, it is possible to provide both of the orifices 56 of the spool valve 52 and the radial gap between the spool valve 52 and the wall of the return passage 50.

In the first embodiment, it is not necessary to provide only the single return passage 50, which connects between the upstream side fuel passage 44 and the valve chamber 46. That is, it is possible to provide multiple return passages, which connect between the upstream side fuel passage 44 and the valve chamber 46. In such a case, the pressure pulsation reducing mechanism 55 may be provided in each of the return passages.

In the first embodiment, the single pressure pulsation reducing mechanism 55 is provided in the return passage 50. However, the present invention is not limited to this construction. For example, in addition to the pressure pulsation reducing mechanism 55, another pressure pulsation reducing mechanism (a second pressure pulsation reducing mechanism) may be provided on the upstream side (the upstream side fuel passage 44 side) of the pressure pulsation reducing mechanism 55 in the return passage 50. Similar to the pressure pulsation reducing mechanism 55, the second pressure pulsation reducing mechanism may include a spool valve (a valve member) and a spring (a resilient element or resilient member). The spool valve may be configured into a generally cylindrical tubular body, which is slidably placed in the corresponding one of the return passages. The spring may be resiliently displaceable in a sliding direction of the spool valve in the corresponding one of the return passages. In addition to the conduction of the abnormal pressure pulsation, which is conducted from the feed pump 22 side to the main filter 34 side in the fuel passage 30, into the return passage 50 by passing through the sub-passage 64 formed in the piston 58, it is possible to conduct the abnormal pressure pulsation from the upstream side fuel passage 44 side end part 50*b* of the return passage 50 into the return passage 50. Therefore, the fuel pressure, which is generated on the upstream side (the upstream side fuel passage 44 side) of the piston 58, can be more rapidly reduced by reducing the abnormal pressure pulsation, which is conducted from the upstream side fuel passage 44 side to the return passage 50, through use of the second pressure pulsation reducing mechanism.

In the first embodiment, the return passage 50 (connection passage) is provided as the passage, which connects between the upstream side fuel passage 44 and the valve chamber 46. However, the present invention is not limited to this construction. For example, the upstream side fuel passage 44 side end part 50*b* of the return passage 50 may be closed, so that the upstream side fuel passage 44 side end of the return passage 50 is not connected to the upstream side fuel passage 44. Even in this case, the valve chamber 46 side end part 50*a* of the return passage 50 is connected with the valve chamber 46 through the sub-passage 64 at the abnormal pressure pulsation generating time to implement the damping effect of the pressure pulsation reducing mechanism 55 and the flow restricting effect of the orifices 56 in the return passage 50 and thereby to reduce the pressure pulsation.

In the first embodiment, the pressure pulsation is reduced by the damping effect of the pressure pulsation reducing mechanism 55, which includes the spool valve 52 and the spring 54. However, the present invention is not limited to this construction. For example, the pressure pulsation reducing mechanism 55 may include only the orifice(s) to reduce the abnormal pressure pulsation through use of the flow restricting effect of the orifice(s). For example, the cross-sectional area of the return passage 50 may be reduced to form the orifice. Even in such a case, the abnormal pressure pulsation can be reduced.

In the second embodiment, the downstream side valve 82 is provided at the portion of the connection passage 76, which is adjacent to the downstream side branch portion 72. However, the present invention is not limited to this construction. For example, the downstream side valve 82 may be eliminated. Even in such a case, the abnormal pressure pulsation can be reduced.

In the third embodiment, the fine passage 86, which communicates between the upstream side fuel passage 44 and the downstream side fuel passage 48 at the abnormal pressure pulsation generating time, is formed in the piston 58. However, the present invention is not limited to this construction. For example, a radial gap, which has the function of the fine passage 86, may be provided between the piston 58 and the wall of the valve chamber 46.

In the above embodiments, the pulsation reducing apparatus is implemented in the common rail fuel injection system of the diesel engine installed in the construction machine (the excavator). However, the present invention is not limited to this application. For example, the pulsation reducing apparatus of the present invention may be implemented in a fuel injection system of a diesel engine of an automobile (e.g., a passenger car).

The resilient member of the pressure pulsation reducing mechanism (serving as a pulsation reducing means) 55 is not limited to the spring 54 and may be alternatively constructed as a bellows.

The internal combustion engine of the present invention is not limited to the compression ignition internal combustion engine, such as the diesel engine. For example, the internal combustion engine of the present invention may be a spark ignition internal combustion engine, such as a direct injection gasoline engine. In the case of the fuel injection system of the direct injection gasoline engine, fuel in the fuel tank is drawn by an electric low pressure pump and is then supplied to an engine-driven high pressure pump thorough a fuel passage. The fuel, which is pressurized to the high pressure by the high pressure pump, is adjusted to have a predetermined pressure through an electronically controlled valve and is then supplied to the fuel injection valves. Here, for example, it is possible to consider a state where the remaining amount of fuel in the fuel tank is excessively reduced, and the fuel is drawn by the low pressure pump along with the air. In this state, if the pressure pulsation, which is generated due to the operation of the low pressure pump, is transmitted to the high pressure pump through the fuel passage to cause the deterioration of the adjusting function for adjusting the pressure of the fuel, which is supplied to the fuel injection valves, the present invention may be effectively applied.

Additional advantages and modifications will readily occur to those skilled in the art. The invention in its broader terms is therefore not limited to the specific details, representative apparatus, and illustrative examples shown and described.

What is claimed is:

1. A pulsation reducing apparatus for a fuel supply system of an internal combustion engine that includes a fuel pump, which pumps fuel out of a fuel tank, and a fuel filter, which receives the fuel from the fuel tank through a fuel passage upon pumping of the fuel by the fuel pump and filters the fuel, the pulsation reducing apparatus being adapted to reduce pressure pulsation of the fuel, which is generated in the fuel passage and is conducted to the fuel filter in the fuel passage due to operation of the fuel pump, and comprising:

a passage cross-sectional area reducing device that reduces a passage cross-sectional area of a predetermined location of the fuel passage on an upstream side of the fuel filter in a flow direction of the fuel when a pressure of the fuel in the fuel passage becomes equal to or higher than a predetermined pressure, wherein the passage cross-sectional area reducing device is placed in the fuel passage on the upstream side of the fuel filter;

a pulsation reducing device that reduces a pressure pulsation of the fuel on an upstream side of the predetermined location of the fuel passage in the flow direction of the fuel; and a connection passage that is connected to the fuel passage at one connection of the connection passage, which is located on the upstream side of the predetermined location of the fuel passage, wherein:

the pulsation reducing device is placed in the connection passage;

fluid communication between the fuel passage and the connection passage is enabled by reducing the passage cross-sectional area of the fuel passage with the passage cross-sectional area reducing device;

the connection passage is further connected to the fuel passage at another connection of the connection passage, which is located on an upstream side of the one connection of the connection passage connected to the fuel passage; and the connection passage is adapted to output the fuel, which is supplied into the connection passage from the one connection of the connection passage, toward an upstream side of the connection passage.

2. The pulsation reducing apparatus according to claim 1, wherein the pulsation reducing device includes:

a valve member that is slidably placed in the connection passage; and a resilient member that is adapted to exert a resilient force against the valve member to displace the valve member.

3. The pulsation reducing apparatus according to claim 1, wherein:

the fuel pump includes:

a low pressure pump that pumps the fuel out of the fuel tank; and a high pressure pump that pressurizes and discharges the fuel, which is supplied from the low pressure pump through the fuel passage and the fuel filter.

4. The pulsation reducing apparatus according to claim 3, wherein:

the fuel pump further includes a pressure regulator valve; and the pressure regulator valve regulates the pressure of the fuel, which is drawn from the fuel tank by the low pressure pump, at a predetermined pressure or less and supplies the regulated fuel to the fuel filter in the fuel passage.

5. The pulsation reducing apparatus according to claim 1, wherein the fuel filter is placed in the fuel passage at a location between an inlet of the fuel pump, into which the fuel drawn from the fuel tank is supplied, and the fuel tank.

6. The pulsation reducing apparatus according to claim 1, wherein the passage cross-sectional area reducing device closes the fuel passage when the pressure of the fuel in the fuel passage becomes equal to or larger than the predetermined pressure.

7. A pulsation reducing apparatus for fuel supply system of an internal combustion engine that includes a fuel pump, which pumps out of a fuel tank, and a fuel filter, which receives the fuel from the fuel tank through a fuel passage upon pumping of the fuel by the fuel pump and filters the fuel, the pulsation reducing apparatus being adapted to reduce pressure pulsation of the fuel, which is generated in the fuel passage and is conducted to the fuel filter in the fuel passage due to operation of the fuel pump, and comprising:

a passage cross-sectional area reducing device that reduces a passage cross-sectional area of a predetermined location of the fuel passage on an upstream side of the fuel filter in a flow direction of the fuel when a pressure of the fuel in the fuel passage becomes equal to or higher than a predetermined pressure, wherein the passage cross-sectional area reducing device is placed in the fuel passage on the upstream side of the fuel filter;

a pulsation reducing device that reduces a pressure pulsation of the fuel on an upstream side of the predetermined location of the fuel passage in the flow direction of the fuel; and a connection passage that is connected to the fuel passage at one connection of the connection passage, which is located on the upstream side of the predetermined location of the fuel passage, wherein:

the pulsation reducing device is placed in the connection passage;

fluid communication between the fuel passage and the connection passage is enabled by reducing the passage cross-sectional area of the fuel passage with the passage cross-sectional area reducing device;

the connection passage is further connected to the fuel passage at another connection of the connection passage, which is located on an upstream side of the one connection of the connection passage;

the pulsation reducing apparatus further comprises an upstream side valve member, which is placed in the connection passage and is adapted to be opened by a predetermined valve opening pressure to conduct the fuel from the fuel passage into the connection passage through the another connection of the connection passage;

the pulsation reducing device is placed on an upstream side of the upstream side valve member in the flow direction of the fuel along the connection passage and includes:

a valve member that is slidably placed in the connection passage; and a resilient member that is adapted to exert a resilient force against the valve member to displace the valve member; and the predetermined valve opening pressure of the upstream side valve member is set to be higher than the pressure of the fuel, which causes the reduction of the passage cross-sectional area of the fuel passage by the passage cross-sectional area reducing device.

8. The pulsation reducing apparatus according to claim 7, further comprising a downstream side valve member that reduces a passage cross-sectional area of the connection passage at a location where the one connection is located when a pressure of the fuel in the connection passage becomes equal to or higher than a predetermined pressure.

9. A pulsation reducing apparatus for a fuel supply system of an internal combustion engine that includes a fuel pump, which pumps fuel out of a fuel tank, and a fuel filter, which receives the fuel from the fuel tank through a fuel passage upon pumping of the fuel by the fuel pump and filters the fuel, the pulsation reducing apparatus being adapted to reduce pressure pulsation of the fuel, which is generated in the fuel passage and is conducted to the fuel filter in the fuel passage due to operation of the fuel pump, and comprising:

a passage cross-sectional area reducing device that reduces a passage cross-sectional area of a predetermined location of the fuel passage on an upstream side of the fuel filter in a flow direction of the fuel when a pressure of the fuel in the fuel passage becomes equal to or higher than a predetermined pressure, wherein the passage cross-sectional area reducing device is placed in the fuel passage on the upstream side of the fuel filter;

a pulsation reducing device that reduces a pressure pulsation of the fuel on an upstream side of the predetermined location of the fuel passage in the flow direction of the fuel; and a connection passage that is connected to the fuel passage at one connection of the connection passage, which is located on the upstream side of the predetermined location of the fuel passage, wherein:

the pulsation reducing device is placed in the connection passage, the pulsation reducing device including:

a valve member that is slidably placed in the connection passage; and a resilient member that is adapted to exert a resilient force against the valve member to displace the valve member;

fluid communication between the fuel passage and the connection passage is enabled by reducing the passage cross-sectional area of the fuel passage with the passage cross-sectional area reducing device; and at least one valve hole is formed through the valve member to communicate the connection passage therethrough.

10. A pulsation reducing apparatus for a fuel supply system of an internal combustion engine that includes a fuel pump, which pumps fuel out of a fuel tank, and a fuel filter, which receives the fuel from the fuel tank through a fuel passage upon pumping of the fuel by the fuel pump and filters the fuel, the pulsation reducing apparatus being adapted to reduce pressure pulsation of the fuel, which is generated in the fuel passage and is conducted to the fuel filter in the fuel passage due to operation of the fuel pump, and comprising:

a passage cross-sectional area reducing device that reduces a passage cross-sectional area of a predetermined location of the fuel passage on an upstream side of the fuel filter in a flow direction of the fuel when a pressure of the fuel in the fuel passage becomes equal to or higher than a predetermined pressure, wherein:

the passage cross-sectional area reducing device is placed in the fuel passage on the upstream side of the fuel filter the passage cross-sectional area reducing device includes a piston that is slidably received in the fuel passage;

the piston has a passage, which extends through the piston in an inside of the piston to conduct the fuel; and an opening area of an outlet of the passage of the piston, which is communicated with the fuel filter, is reduced when the pressure of the fuel in the fuel passage becomes equal to or higher than the predetermined pressure.

* * * * *